US011917429B2

(12) United States Patent
Akl et al.

(10) Patent No.: US 11,917,429 B2
(45) Date of Patent: Feb. 27, 2024

(54) CELL RESOURCE CONFIGURATION REPORTING

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/447,522

(22) Filed: Sep. 13, 2021

(65) Prior Publication Data

US 2022/0086660 A1 Mar. 17, 2022

Related U.S. Application Data

(60) Provisional application No. 62/706,851, filed on Sep. 14, 2020.

(51) Int. Cl.

| | |
|---|---|
| ***H04W 88/04*** | (2009.01) |
| ***H04B 7/155*** | (2006.01) |
| ***H04W 24/02*** | (2009.01) |
| ***H04W 72/044*** | (2023.01) |
| ***H04L 5/00*** | (2006.01) |

(52) U.S. Cl.
CPC .......... *H04W 24/02* (2013.01); *H04L 5/0053* (2013.01); *H04W 72/044* (2013.01)

(58) Field of Classification Search
CPC .... H04W 24/02; H04W 72/044; H04L 5/0053
See application file for complete search history.

(56) References Cited

U.S. PATENT DOCUMENTS

| | | | | |
|---|---|---|---|---|
| 2020/0351874 | A1* | 11/2020 | Luo | H04W 72/0446 |
| 2020/0351929 | A1* | 11/2020 | Luo | H04W 72/1273 |
| 2021/0076326 | A1* | 3/2021 | Akl | H04W 52/0206 |

(Continued)

FOREIGN PATENT DOCUMENTS

| | | | | |
|---|---|---|---|---|
| WO | WO-2019245547 A1 | * 12/2019 | | H04L 5/001 |
| WO | WO-2020146631 A1 | * 7/2020 | | H04L 5/001 |
| WO | WO-2020194271 A1 | * 10/2020 | | H04W 36/08 |

OTHER PUBLICATIONS

3GPP TSG-RAN WG2 Meeting #107, R2-1909433 Title: Considerations on donor and node routing (Year: 2019).*

(Continued)

*Primary Examiner* — Diane L Lo
*Assistant Examiner* — Abusayeed M Haque
(74) *Attorney, Agent, or Firm* — Arun Swain

(57) ABSTRACT

Various aspects of the present disclosure generally relate to wireless communication. In some aspects, a network node may transmit, to an integrated access and backhaul (IAB) donor central unit (CU), information indicating a cell served by the network node and associated with another CU. The network node may receive, from the IAB donor CU, a distributed unit (DU) cell resource configuration for the cell. Numerous other aspects are described.

30 Claims, 12 Drawing Sheets

(56) References Cited

U.S. PATENT DOCUMENTS

2021/0112415 A1* 4/2021 Lee .................... H04L 69/40
2023/0050970 A1* 2/2023 Luo .................... H04W 72/541
2023/0080218 A1* 3/2023 Pezeshki .............. H04W 24/04 370/329
2023/0086079 A1* 3/2023 Novlan .................... H04L 5/14 370/254
2023/0100121 A1* 3/2023 Liu .................... H04W 8/26 455/446
2023/0106730 A1* 4/2023 Chen .................... H04L 5/0064 370/329

OTHER PUBLICATIONS

Catt: "(TP for NR_IAB BL CR for TS 38.401) Inter-CU IAB-Node Migration", 3GPP TSG-RAN WG3 #105bis, 3GPP Draft, R3-195365 (TP for NR IAB BL CR for TS 38.401) Inter-CU IAB-Node Migration, 3rd Generation Partnership Project (3GPP), Mobile Competence Centre, 650, Route Des Lucioles, F-06921 Sophia-Antipolis Cedex, France, vol. RAN WG3, No. Chongqing, China, Oct. 14, 2019-Oct. 183, 2019, Oct. 2019 (Oct. 3, 2019), 9 Pages, XP051792402, Retrieved from the Internet: URL: https://www.3gpp.org/ftp/tsg_ran/WG3_lu/TSGR3_105bis/Docs/R3-195365.zip, [retrieved on Oct. 3, 2019], clause 8.2.y, figures 8.2.y-1, 9.7.6-1.

International Search Report and Written Opinion—PCT/US2021/071443—ISA/EPO—dated Jan. 4, 2022.

Qualcomm Incorporated: "IAB Support for RAN Shared Between PLMN and NPN", 3GPP Draft, 3GPP TSG-RAN WG3 Meeting #109-e, 3GPP TSG-RAN WG3 Meeting #109-e, R3-204800, 3rd Generation Partnership Project (3GPP), Mobile Competence Centre, 650, Route Des Lucioles, F-06921 Sophia-Antipolis Cedex, France, vol. RAN WG3, No. E-meeting, Aug. 17, 2020-Aug. 28, 2020, Aug. 6, 2020 (Aug. 6, 2020), XP051911265, 3 Pages, Retrieved from the Internet: URL: https://ftp.3gpp.org/tsg_ran/WG3_lu/TSGR3_109-e/Docs/R3-204800.zip. R3-204800 IAB Support for RAN Shared Between PLMN and NPN.docx. [Retrieved on Aug. 6, 2020] Discussion, p. 1, Paragraph 2-p. 2.

Qualcomm Incorporated: "Inter-Donor IAB-Node Migration", 3GPP Draft, 3GPP TSG-RAN WG3 Meeting #109-e, R3-204795, 3rd Generation Partnership Project (3GPP), Mobile Competence Centre, 650, Route Des Lucioles, F-06921 Sophia-Antipolis Cedex, France, vol. RAN WG3, No. E-meeting, Aug. 17, 2020-Aug. 28, 2020, Aug. 6, 2020 (Aug. 6, 2020), XP051911260, pp. 1-5, Retrieved from the Internet: URL: https://ftp.3gpp.org/tsg_ran/WG3_lu/TSGR3_109-e/Docs/R3-204795.zip. R3-204795 Inter-donor IAB-node migration.docx [retrieved on Aug. 6, 2020] Discussion; p. 1, paragraph 2-p. 4, p. 2, line 9-line 23 p. 3, Option 2b.

Samsung: "Discussion on Inter-Donor IAB Node Migration", 3GPP Draft, 3GPP TSG-RAN WG3 #109-e, R3-205411, 3rd Generation Partnership Project (3GPP), Mobile Competence Centre, 650, Route Des Lucioles, F-06921 Sophia-Antipolis Cedex, France, vol. RAN WG3, No. Online, Aug. 17, 2020-Aug. 28, 2020, Aug. 7, 2020 (Aug. 7, 2020), XP051916077, 6 Pages, Retrieved from the Internet: URL: https://ftp.3gpp.org/tsg_ran/WG3_lu/TSGR3_109-e/Docs/R3-205411.zip. R3-205411_InterCU_migr_v0.2.doc. [Retrieved on Aug. 7, 2020] IAB-DU part Establishment, p. 2, paragraph 2.2-p. 3 Overall procedure, p. 5, paragraph 2.4-p. 6.

* cited by examiner

CELL RESOURCE CONFIGURATION REPORTING

CROSS-REFERENCE TO RELATED APPLICATION

This Patent Application claims priority to U.S. Provisional Patent Application No. 62/706,851, filed on Sep. 14, 2020, entitled "CELL REPORTING FOR INTEGRATED ACCESS AND BACKHAUL RADIO ACCESS NETWORK SHARING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for cell reporting for integrated access and backhaul (IAB) radio access network (RAN) sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a network node includes transmitting, to an integrated access and backhaul (IAB) donor central unit (CU), information indicating a cell served by the network node and associated with another CU; and receiving, from the IAB donor CU, a distributed unit (DU) cell resource configuration for the cell.

In some aspects, a method of wireless communication performed by an IAB donor CU includes receiving, from a network node, information indicating a cell served by the network node and associated with another CU; and transmitting, to the network node, a DU cell resource configuration for the cell.

In some aspects, a network node for wireless communication includes a memory and one or more processors coupled to the memory, the one or more processors configured to: transmit, to an IAB donor CU, information indicating a cell served by the network node and associated with another CU; and receive, from the IAB donor CU, a DU cell resource configuration for the cell.

In some aspects, an IAB donor CU for wireless communication includes a memory and one or more processors coupled to the memory, the one or more processors configured to: receive, from a network node, information indicating a cell served by the network node and associated with another CU; and transmit, to the network node, a DU cell resource configuration for the cell.

In some aspects, a non-transitory computer-readable medium storing a set of instructions for wireless communication includes one or more instructions that, when executed by one or more processors of a network node, cause the network node to: transmit, to an IAB donor CU, information indicating a cell served by the network node and associated with another CU; and receive, from the IAB donor CU, a DU cell resource configuration for the cell.

In some aspects, a non-transitory computer-readable medium storing a set of instructions for wireless communication includes one or more instructions that, when executed by one or more processors of an IAB donor CU, cause the IAB donor CU to: receive, from a network node, information indicating a cell served by the network node and associated with another CU; and transmit, to the network node, a DU cell resource configuration for the cell.

In some aspects, an apparatus for wireless communication includes means for transmitting, to an IAB donor CU, information indicating a cell served by the apparatus and associated with another CU; and means for receiving, from the IAB donor CU, a DU cell resource configuration for the cell.

In some aspects, an apparatus for wireless communication includes means for receiving, from a network node, information indicating a cell served by the network node and associated with another CU; and means for transmitting, to the network node, a DU cell resource configuration for the cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
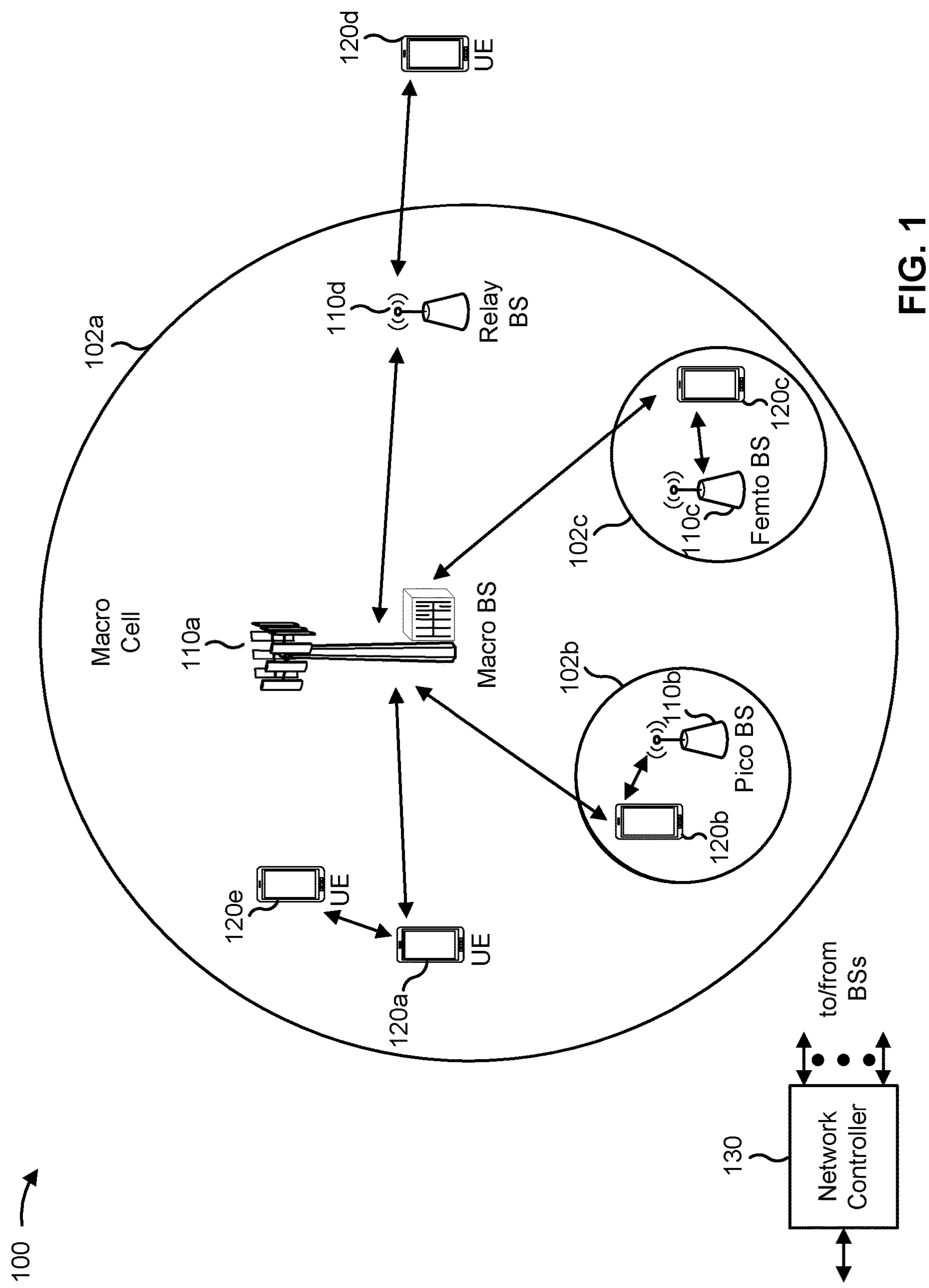
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a,* BS 110*b,* BS 110*c,* and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a,* a BS 110*b* may be a pico BS for a pico cell 102*b,* and a BS 110*c* may be a femto BS for a femto cell 102*c.* A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d.* A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a,* 120*b,* 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
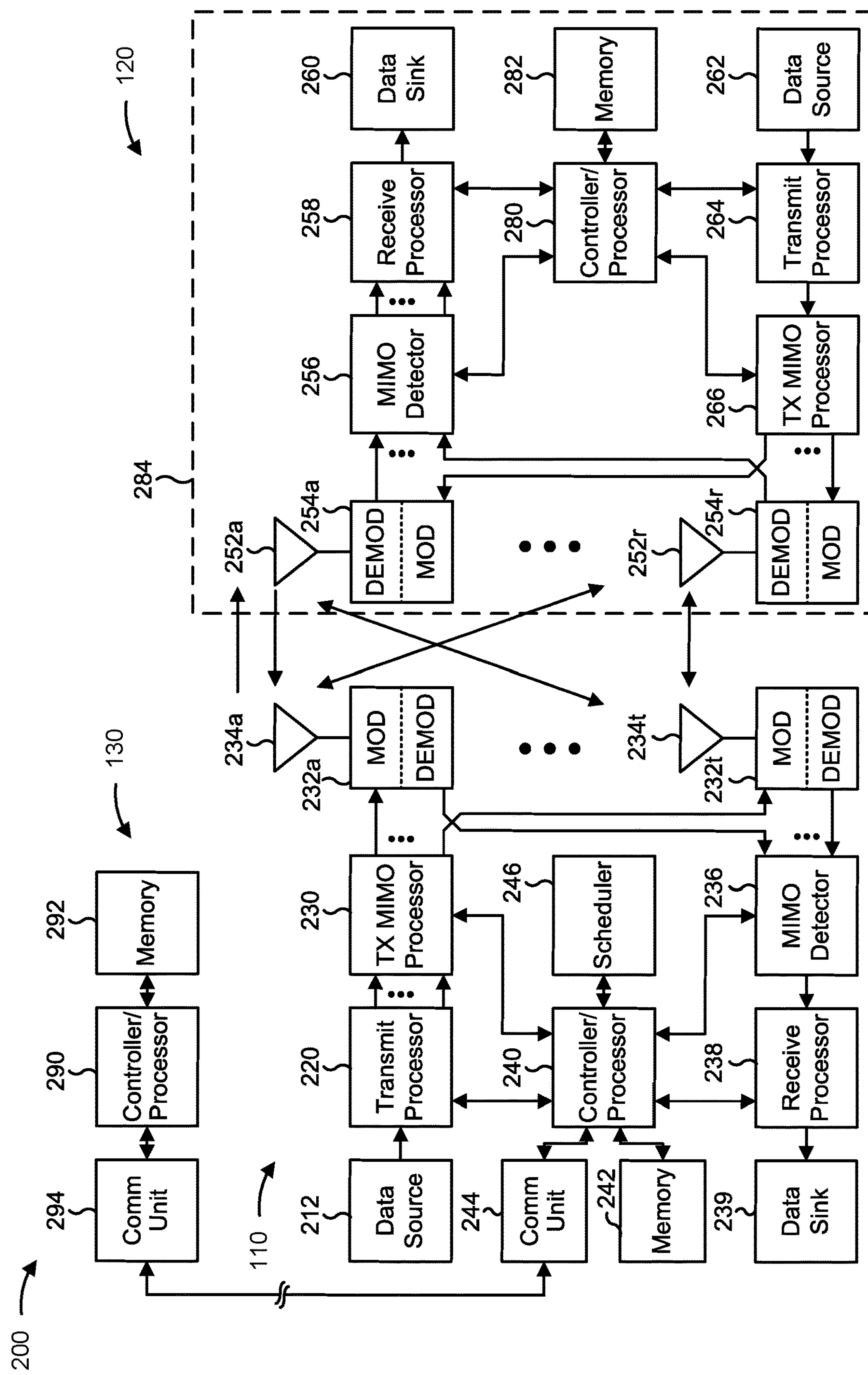
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-12.

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a network node (e.g., BS 110) includes means for transmitting, to an integrated access and backhaul (IAB) donor central unit (CU), information indicating a cell served by the network node and associated with another CU; and/or means for receiving, from the IAB donor CU, a distributed unit (DU) cell resource configuration for the cell. The means for the network node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the network node includes means for communicating on the cell based at least in part on the DU cell resource configuration. In some aspects, the network node includes means for providing service to a child node of the network node, wherein the child node is associated with a radio resource control connection to the other CU. In some aspects, the network node includes means for receiving an indication, from the other CU, that the cell is activated; and/or means for communicating on the cell based at least in part on the DU cell resource configuration and based at least in part on receiving the indication. In some aspects, the network node includes means for transmitting, to the IAB donor CU, information indicating an activation status of the cell based at least in part on receiving the indication. In some aspects, the network node includes means for receiving, from the other CU, configuration information for the cell; and/or means for transmitting, to the IAB donor CU, at least part of the configuration information, wherein the DU cell resource configuration is based at least in part on the configuration information. In some aspects, the network node includes means for communicating with a parent node of the network node based at least in part on configuration information associated with the cell.

In some aspects, the IAB donor CU includes means for receiving, from a network node, information indicating a cell served by the network node and associated with another CU; and/or means for transmitting, to the network node, a DU cell resource configuration for the cell. The means for the IAB donor CU to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the IAB donor CU includes means for receiving, from the network node, information indicating an activation status of the cell. In some aspects, the IAB donor CU includes means for receiving, from the network node, configuration information for the cell, wherein the DU cell resource configuration is based at least in part on the configuration information. In some aspects, the IAB donor CU includes means for transmitting, to a parent node of the network node, configuration information regarding the cell.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
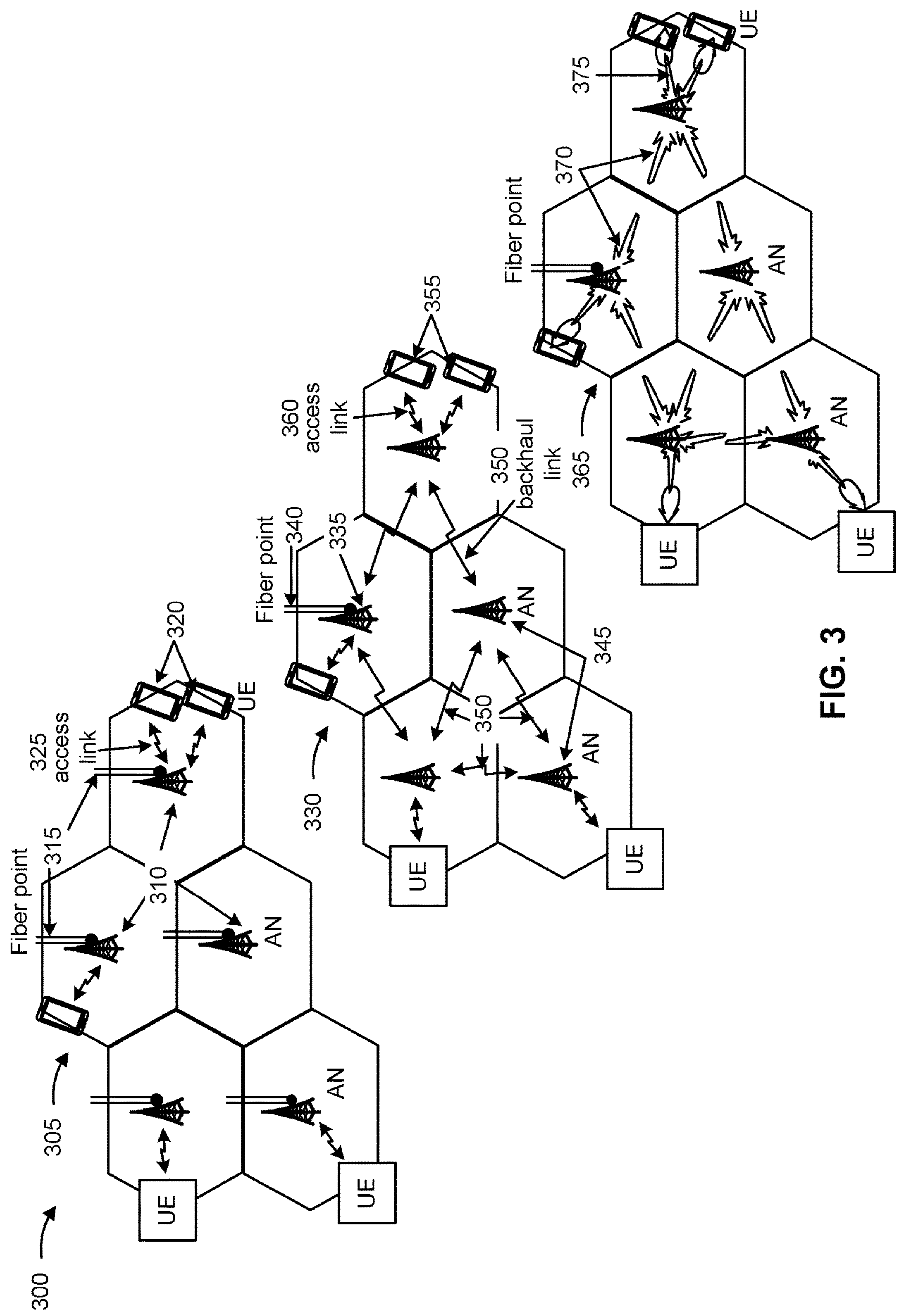
FIG. 3 is a diagram illustrating examples of radio access networks, in accordance with the present disclosure.

FIG. 3 is a diagram illustrating examples 300 of radio access networks, in accordance with the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
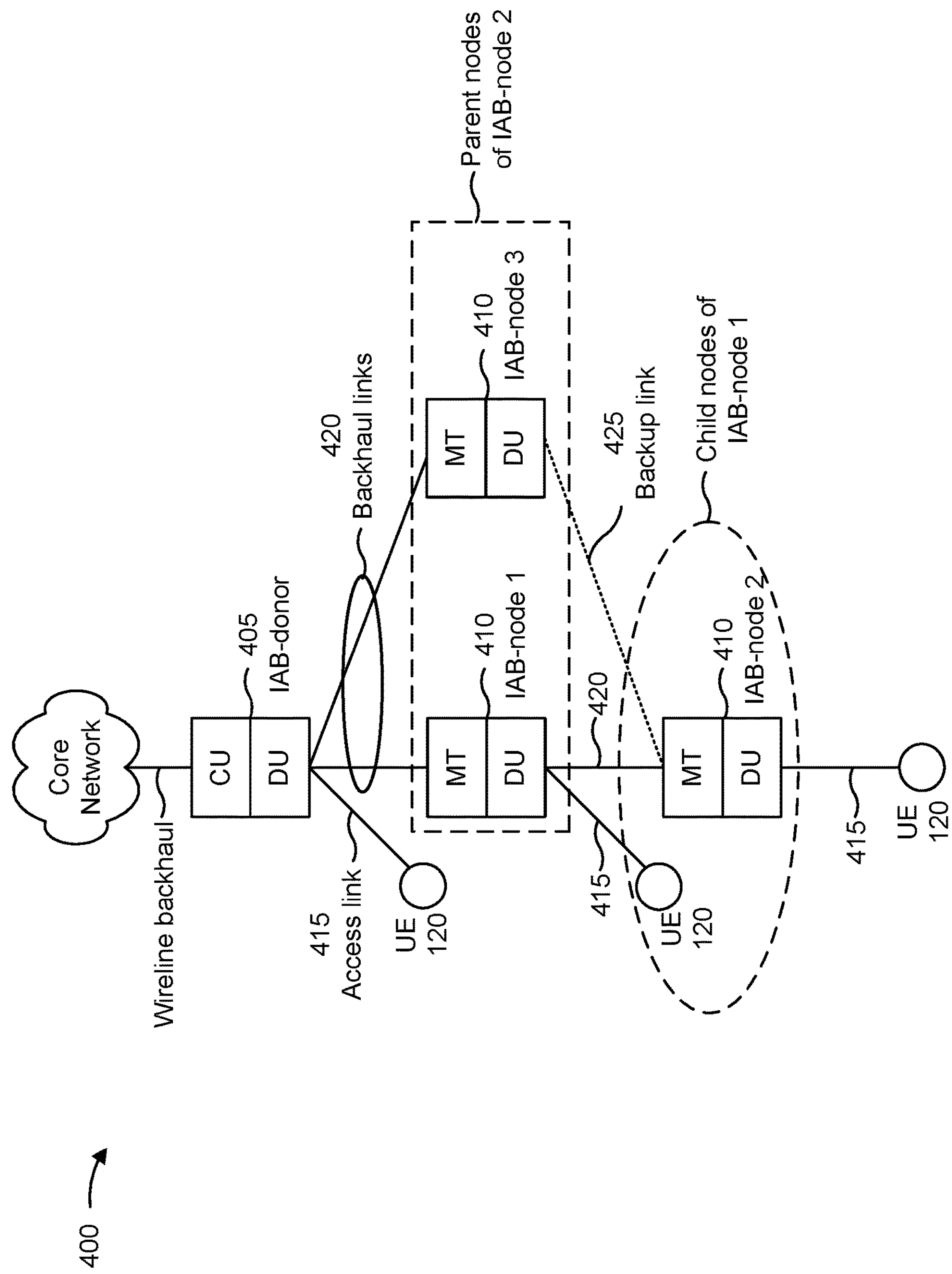
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface (e.g., a user plane interface between the next generation radio access network (NG-RAN) node and the user plane function) of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a CU, which may perform access node controller (ANC) functions, AMF functions, and/or the like. The CU may configure a DU of the IAB donor 405 and/or may configure one or more IAB nodes 410 (e.g., an mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like). An IAB node may function as a Layer 2 relay for traffic transported via an IAB network configured or managed by a CU.

A CU (whether associated with an IAB donor or a gNB) may perform RRC layer functions and packet data convergence protocol (PDCP) functions. A DU may act as a scheduling node that schedules child nodes of a network node associated with the DU. For example, the DU may perform radio link control (RLC), medium access control (MAC), and physical (PHY) layer functions.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Figure 5:
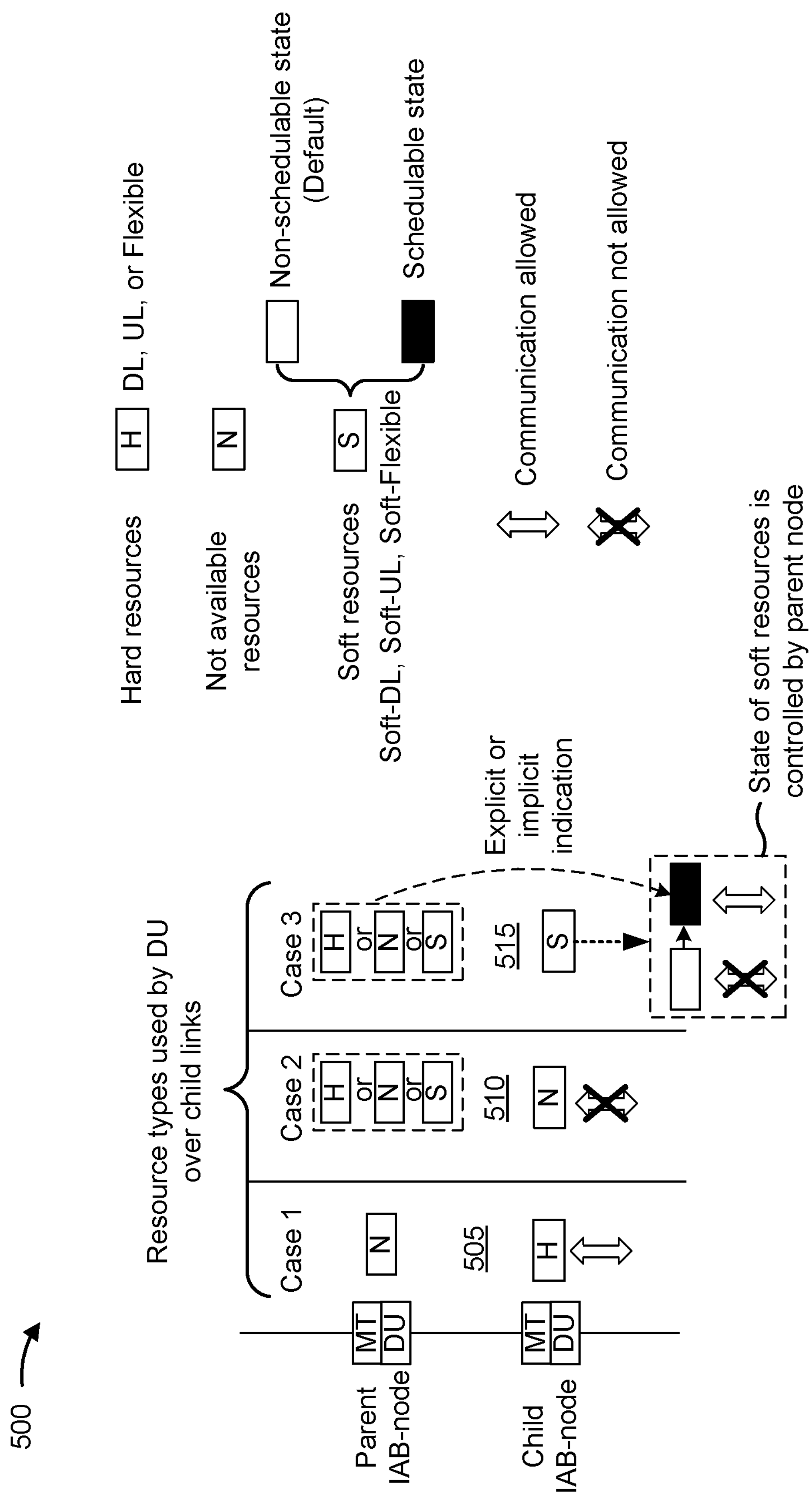
FIG. 5 is a diagram illustrating an example of resource types in an IAB network, in accordance with the present disclosure.

FIG. 5 is a diagram illustrating an example 500 of resource types in an IAB network, in accordance with the disclosure.

In an IAB network, time domain resources (sometimes referred to as time resources) may be configured as downlink-only, uplink-only, flexible, or not available (e.g., NA, unavailable). For example, time domain resources may be configured via a DU cell resource configuration, such as a gNB-DU cell resource configuration, as described in more detail in connection with FIG. 6. When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs) (both cell defining SSBs (CD-SSBs) and non-CD-SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, sounding reference signals (SRS), and/or the like.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples are possible and may differ from what was described with regard to FIG. 5.

Figure 6:
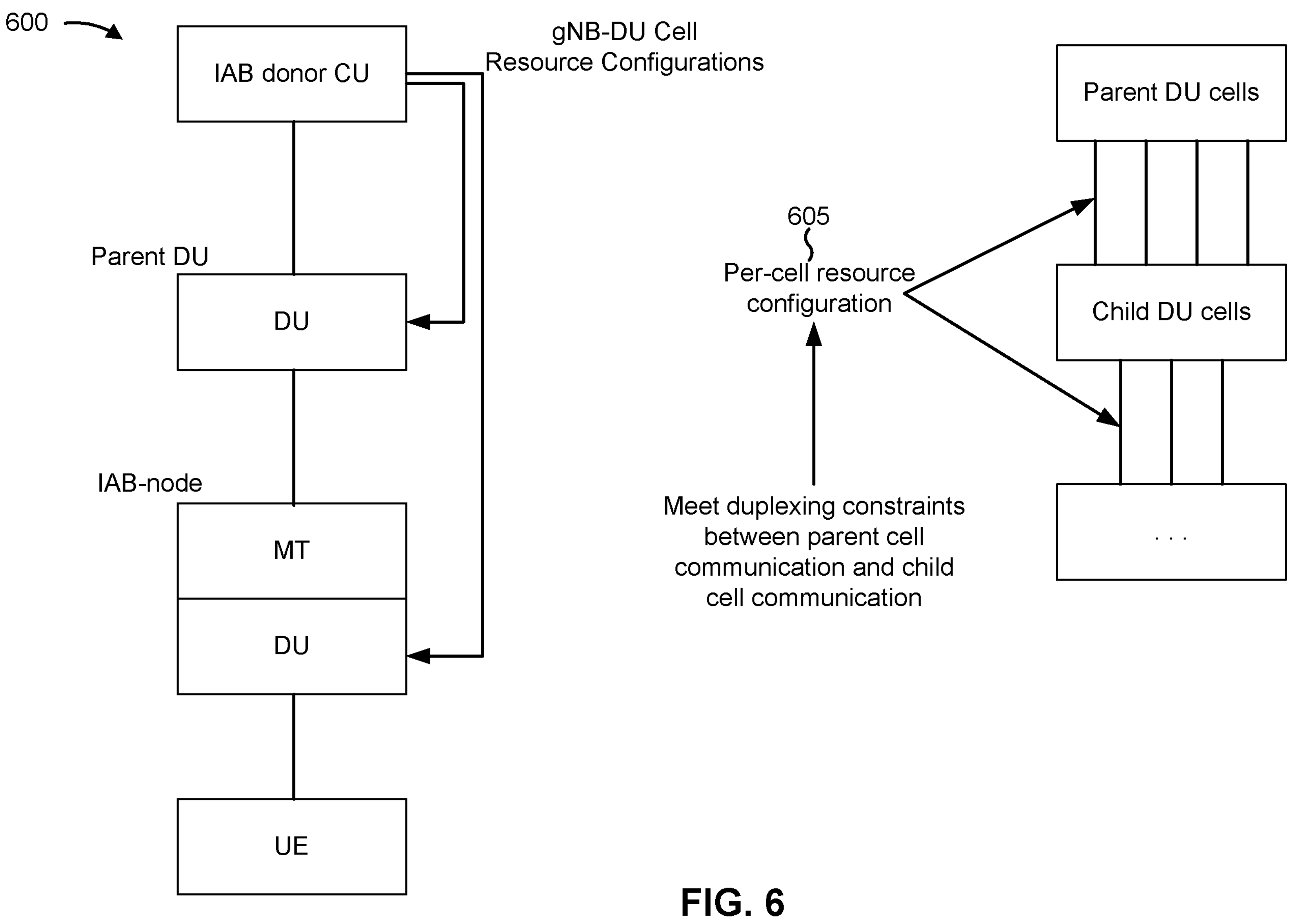
FIG. 6 is a diagram illustrating an example of distributed unit (DU) cell resource configuration for IAB, in accordance with the present disclosure.

FIG. 6 is a diagram illustrating an example 600 of DU cell resource configuration for IAB, in accordance with the present disclosure. Example 600 includes an IAB-donor CU. The IAB-donor CU may be associated with a gNB. The IAB-donor CU may handle resource configuration for the parent DU and the IAB node. Thus, the IAB-donor CU may accommodate half-duplex constraints of the parent DU, the IAB node, and/or other nodes of the IAB network.

The IAB-donor CU may provide a resource configuration via a cell resource configuration, shown as "gNB-DU cell resource configuration." In some aspects, as shown by reference number 605, the cell resource configuration may be specific to a cell. For example, the IAB-donor CU may provide a respective cell resource configuration for each cell served by a DU. The cell resource configuration may indicate at least part of the information described with regard to FIG. 5.

The term "cell" may refer to a logical communication entity used for communication with a base station (e.g., over a carrier), and may be associated with an identifier for distinguishing neighboring cells operating via the same or a different carrier. In some examples, the cells may support different service and/or device types (e.g., MTC, narrowband Internet-of-Things (NB-IoT), enhanced mobile broadband (eMBB), ultra-reliable low-latency communications (URLLC), and others). In some cases, the term "cell" may refer to a portion of a geographic coverage area (e.g., a sector) over which the logical entity operates. A cell may be referred to as "served by" a DU if the DU handles scheduling for communications via the cell.

A cell may have a cell global identifier (CGI), such as an NR CGI (NCGI). The NCGI uniquely identifies a cell. The NCGI includes a public land mobile networks (PLMN) identifier and an NR cell identifier. The PLMN identifier (which may include 24 bits) may include an MCC (e.g., 12 bits) and an MNC (e.g., 12 bits). The NCI (e.g., 36 bits in 5G) may include a gNB identifier (e.g., a leftmost 22 to 32 bits) and a local cell identifier (e.g., the remaining bits of the NCI). The gNB may be unique within a gNB, and may be common for all cells (e.g., all IAB-donor DUs and all IAB-node DUs) served by the gNB with one IAB-donor CU. Equivalently, the PLMN and gNB ID may globally identify a gNB.

As indicated above, FIG. 6 is provided as an example. Other examples are possible and may differ from what was described with regard to FIG. 6.

Figure 7:
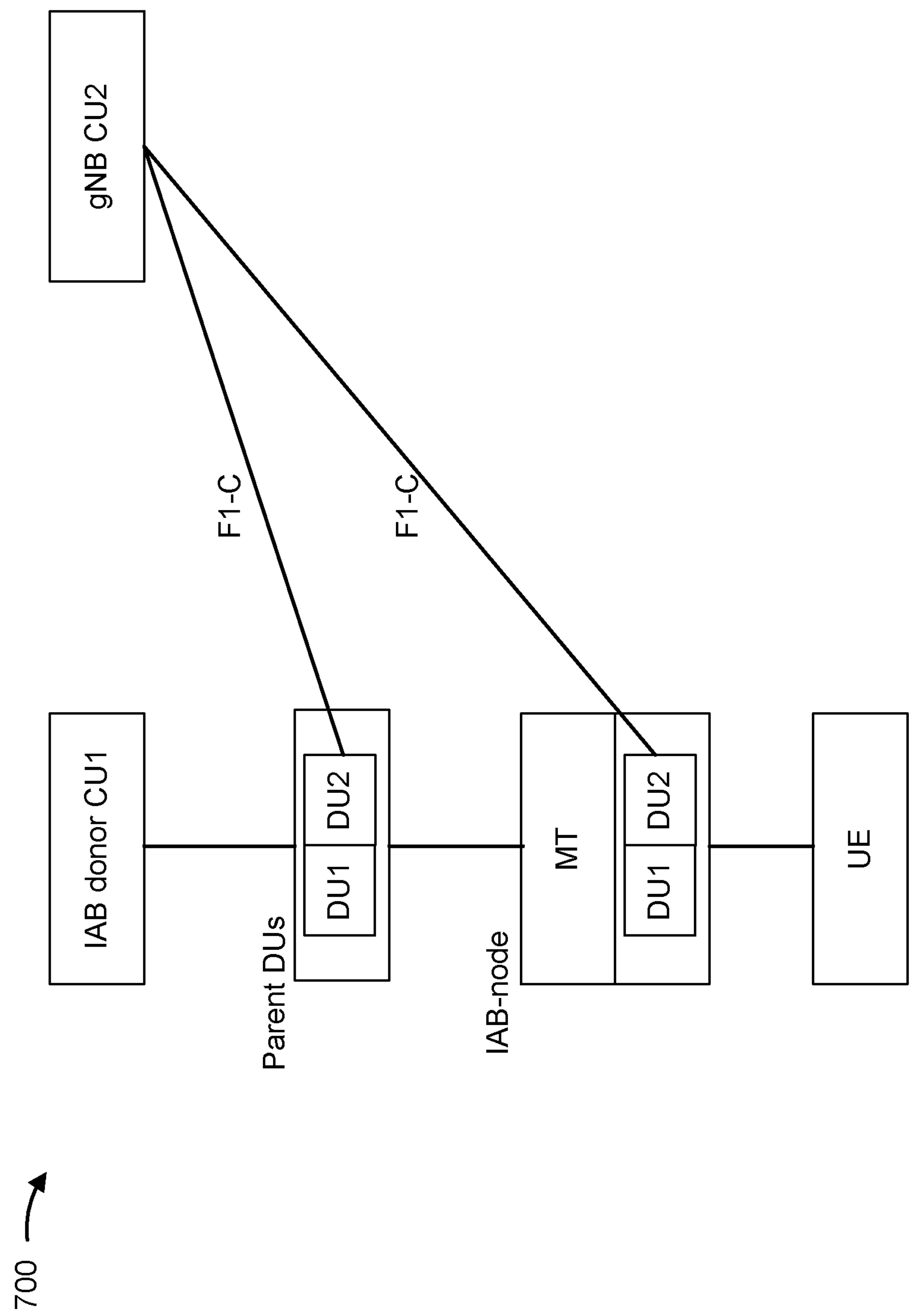
FIG. 7 is a diagram illustrating an example of radio access network (RAN) sharing for IAB, in accordance with the present disclosure.

FIG. 7 is a diagram illustrating an example 700 of radio access network (RAN) sharing for IAB, in accordance with the present disclosure.

As shown in FIG. 7, in a RAN sharing scenario, there may be two CUs: an IAB donor CU1 (referred to as a CU1) and a gNB CU2 (referred to as a CU2). CU1 may be associated with an enhanced gNB that supports IAB functionality. CU2 may be associated with an access network gNB or an IAB-supporting gNB. CU2 may treat the DUs of the parent DU and the IAB-node (shown as DU2) as wireline DUs. In other words, in some cases, CU2 may not know that the DUs of example 700 are part of an IAB network and are associated with a wireless backhaul. For example, CU2 may communicate with the DUs of the parent DU and the IAB-node based at least in part on an F1 control (F1-C) protocol or an RRC protocol in the Internet Protocol (IP) layer. In some aspects, CU1 and CU2 may be associated with different networks, such as different PLMNs or different non-public networks (NPNs). In some aspects, CU1 and CU2 may be associated with the same network, such as the same PLMN or the same NPN. In some aspects, CU1 and CU2 may be associated with different mobile network operators. In some aspects, the parent DUs of the IAB node may be associated with the IAB-donor CU1. For example, the parent DUs may be implemented by a gNB associated with the IAB-donor CU1. In some aspects, the parent DUs of the IAB node may be associated with a parent node of the IAB node.

In some aspects, a cell may be associated with one CU (e.g., IAB-donor CU1) and another cell associated with another CU (e.g., gNB-CU2) may be served on the same physical resources (e.g., the same antenna, the same transmit or receive resources, the same network node, and/or the like). In some aspects, the same cell may serve children of two CUs. In this example, the cell may be associated with multiple NCIs (but may still have a unique NCGI).

CU1 may provide cell resource configurations for the parent DU and the IAB-node, since CU1 supports IAB functionality. Thus, CU1 may accommodate half-duplex constraints of the parent DU and/or the IAB node. However, if an IAB node is associated with DUs that are associated with two or more different CUs (such as CU1 and CU2 of example 700), then a cell associated with a first CU may cause interference with a cell associated with a second CU. For example, an IAB node may be associated with a RAN sharing configuration and may be associated with two or more CUs. Thus, if an IAB-donor CU is not aware that an IAB node is associated with DUs associated with multiple different CUs, the IAB-donor CU may provide a cell resource configuration that causes interference between cells associated with DUs associated with different CUs. Such interference may diminish throughput, cause radio link failure, and necessitate aggressive interference mitigation, thus consuming network resources.

Some techniques and apparatuses described herein provide signaling that enables an IAB node to indicate, to an IAB donor CU associated with the IAB node, that the IAB node is associated with one or more cells or DUs that are associated with multiple CUs. Thus, the IAB donor CU can provide cell resource configurations that take into account the one or more cells or DUs that are associated with multiple CUs. By providing cell resource configurations that take into account the one or more cells or DUs that are associated with multiple CUs, the IAB donor CU may reduce interference, improve efficiency of communication, and improve utilization of network resources.

As indicated above, FIG. 7 is provided as an example. Other examples may differ from what was described with regard to FIG. 7.

Figure 8:
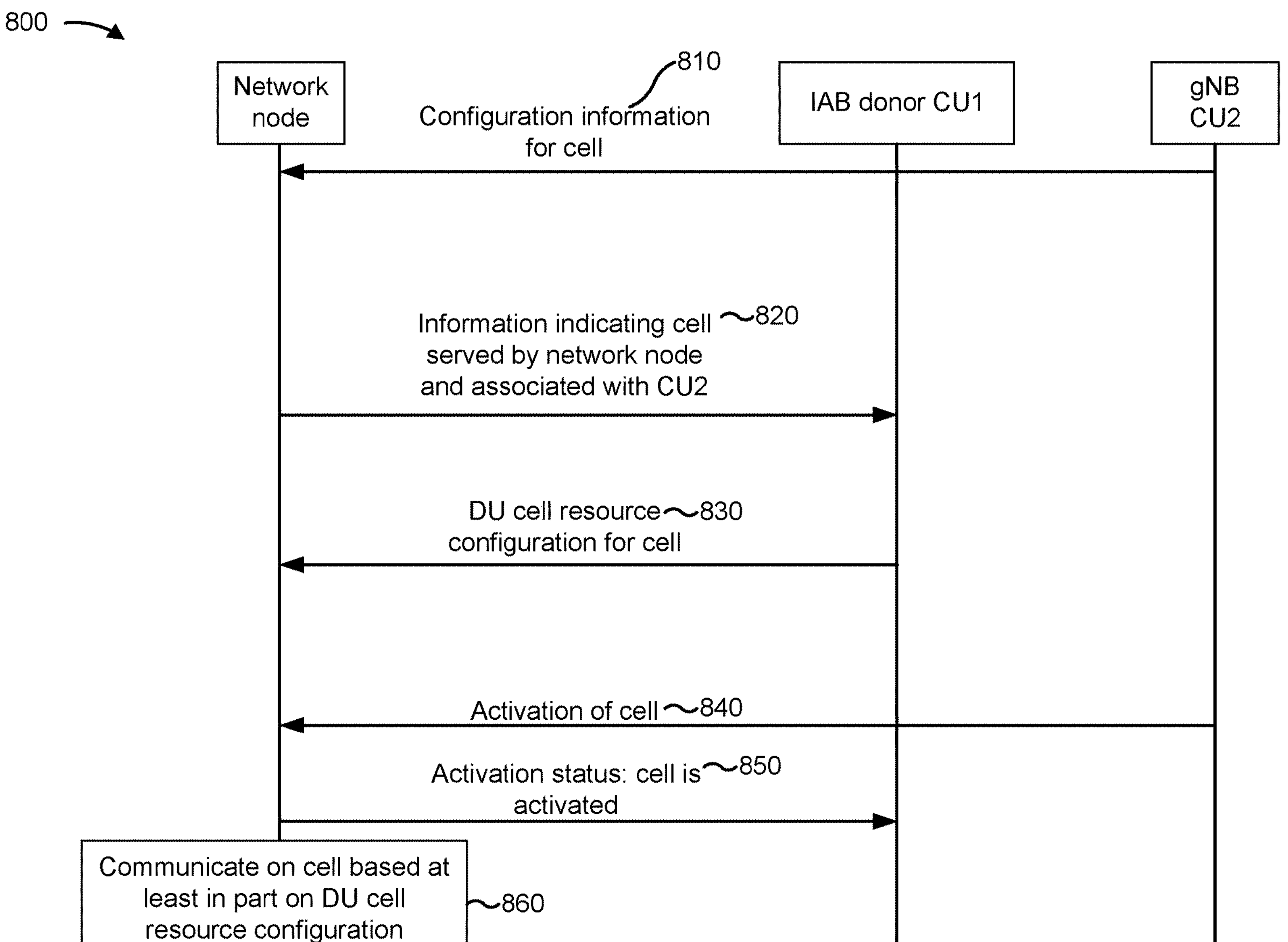
FIG. 8 is a diagram illustrating an example of signaling associated with indicating, to an IAB donor central unit (CU), that a network node is associated with cells or DUs associated with multiple CUs, in accordance with the present disclosure.

FIG. 8 is a diagram illustrating an example 800 of signaling associated with indicating, to an IAB donor CU, that a network node is associated with cells or DUs associated with multiple CUs, in accordance with the present disclosure. As shown, example 800 includes a network node, an IAB donor CU1 (referred to hereinafter as CU1) and a gNB CU2 (referred to hereinafter as CU2). The network node may include, for example, the IAB node of FIG. 7. The IAB donor CU1 may include the IAB donor CU1 of FIG. 7. For example, the IAB donor CU1 may oversee resource management for IAB. The gNB CU2 may include the gNB CU2 of FIG. 7. For example, the gNB CU2 may use an IAB network managed by the IAB donor CU1 for traffic transport.

In some aspects, CU2 may be an IAB donor CU. In some aspects, the network node may provide a DU associated with CU1 and a DU associated with CU2. In some aspects, the network node may be an IAB node, such as an IAB donor DU associated with CU1. In some aspects, the network node may have a signaling connection with CU1. For example, the signaling connection may be associated with an F1-C protocol or an RRC protocol, among other examples. In some aspects, the network node may have a signaling connection with CU2. For example, the signaling connection may be associated with an F1-C protocol or an RRC protocol, among other examples.

As shown in FIG. 8, and by reference number 810, in some aspects, CU2 may provide, to the network node, configuration information for a cell. For example, in some aspects, the cell may be configured by CU2. If the cell is configured by CU2, then the cell may be associated with an identifier associated with CU2, such as an NCI that carries an identifier of the gNB associated with the gNB CU2. In some aspects, the cell may be configured by CU1. If the cell is configured by CU1, then the network node may receive the configuration information for the cell from CU1. In some aspects, the cell may be associated with a time division duplexing (TDD) mode. For example, the cell may be a TDD cell. In some aspects, the cell may be associated with a frequency division duplexing (FDD) mode. For example, the cell may be an FDD cell.

In some aspects, the cell may be associated with an identifier associated with CU1. For example, the cell may have an NCI that carries an identifier of CU1. In this case, the cell may be deactivated by CU1 or access may be barred for child nodes that select a PLMN associated with CU1. In some aspects, the cell may provide service to a child node that is connected to CU2 (not shown in FIG. 8). For example, the child node may be RRC connected to CU2. The child node may be a UE or an IAB node.

The configuration information may include, for example, a transmit configuration of CD-SSBs associated with the cell, an IAB SSB transmission configuration (STC) configuration for the cell, a random access channel (RACH) configuration for the cell, a CSI-RS configuration for the cell, a scheduling request (SR) configuration for the cell, a PDCCH configuration for the cell, a subcarrier spacing for transmissions of the cell, multiplexing information for communications of the first cell and a second cell served by a parent node or child node of the network node, a combination thereof, or similar information.

In some aspects, CU1 may transmit, to a parent node (e.g., the parent DU described in connection with FIG. 6) of the network node, configuration information regarding the cell associated with CU2. For example, CU1 may forward at least part of the configuration information described above to the parent node. As another example, CU1 may transmit, to the parent node of the network node, a DU cell resource configuration for the cell. The DU cell resource configuration is described in more detail in connection with reference number 830, below. The parent node of the network node may communicate with the network node based at least in part on the configuration information, as described elsewhere herein.

As shown by reference number 820, the network node may provide, to CU1, information indicating the cell served by the network node and associated with CU2. For example, the network node may report an indication that the cell served by the network node is associated with CU2. In some aspects, the network node may provide at last part of the configuration information described with regard to reference number 810. In some aspects, the network node may provide the information indicating the cell based at least in part on the cell being activated by CU2. For example, and as described in more detail below, CU2 may activate the cell, and the network node may provide the information indicating the cell based at least in part on CU2 activating the cell.

As shown by reference number 830, CU1 may provide a DU cell resource configuration for the cell. For example, CU1 may determine the DU cell resource configuration for the cell and may transmit information indicating the DU cell resource configuration to the network node. In some aspects, CU1 may determine the DU cell resource configuration based at least in part on configuration information associated with the cell, such as the configuration information described in connection with reference number 810. In some aspects, CU1 may determine the DU cell resource configuration so that half duplex constraints of the network node and/or other nodes of the IAB network are accommodated (e.g., are not violated). Thus, the DU cell resource configuration may reduce interference in the IAB network and may improve throughput of the IAB network.

In some aspects, the DU cell resource configuration may include at least part of the information described in connection with the cell resource configuration of FIG. 5. For example, the DU cell resource configuration may be a gNB DU cell resource configuration. In some aspects, if the cell is associated with an FDD mode, then the DU cell resource configuration may include a configuration for uplink communications and a configuration for downlink communications. In some aspects, the DU cell resource configuration may indicate the availability of a communication resource of the cell (e.g., whether the communication resource is available, not available, or conditionally available). In some aspects, the DU cell resource configuration may indicate a direction associated with a communication resource of the cell (e.g., whether the resource is an uplink resource, a downlink resource, or a flexible resource). In some aspects, the DU cell resource configuration may indicate a cell direction associated with the cell (e.g., whether the cell is an uplink cell, a downlink cell, or a bidirectional cell). The communication resource may be a time resource, a frequency resource, and/or a spatial resource.

In some aspects, the DU cell resource configuration may be defined at a per-slot granularity. For example, the DU cell resource configuration may indicate a resource configuration for the cell and for a slot. In some aspects, the DU cell resource configuration may be defined at a per-symbol granularity. For example, the DU cell resource configuration may indicate a resource configuration for the cell and for a symbol of a slot. In some aspects, the DU cell resource configuration may be defined at a per-symbol-group granularity. For example, the DU cell resource configuration may indicate a resource configuration for the cell and for a group of one or more symbols within a slot (e.g., symbols associated with a same uplink/downlink direction).

In some aspects, the DU cell resource configuration may be defined at a frequency granularity. For example, the DU cell resource configuration may be defined for a carrier associated with the first cell. As another example, the DU cell resource configuration may be defined at a per-bandwidth-part granularity. As yet another example, the DU cell resource configuration may be defined per resource block of the cell, or per group of resource blocks of the cell.

In some aspects, the DU cell resource configuration may be associated with a spatial region. For example, the DU cell resource configuration may be associated with a beam direction (e.g., a set of quasi-colocation parameters indicating the beam direction). As another example, the DU cell resource configuration may be associated with an SSB area (e.g., an area associated with a particular SSB).

In some aspects, the DU cell resource configuration may be associated with a node. For example, the DU cell resource configuration may be specific to a child node served by the cell (e.g., a child node of the network node).

As shown by reference number 840, CU2 may activate the cell. For example, CU2 may provide, via an F1-C or RRC interface, signaling to cause the network node to activate the cell. In some aspects, CU2 may activate the cell prior to CU1 providing the DU cell resource configuration. For example, CU2 may activate the cell, and then CU1 may provide the DU cell resource configuration based at least in part on CU2 activating the cell.

As shown by reference number 850, the network node may provide, to CU1, an indication of an activation status of the cell. For example, the network node may report the activation of the cell to CU1. In some aspects, the network node may provide the indication of the activation status based at least in part on CU2 activating the cell. In some aspects, the network node may provide the indication of the activation status of the cell prior to receiving the DU cell resource configuration. For example, the network node may provide the indication of the activation status of the cell based at least in part on the cell being activated by CU2, and CU1 may provide the DU cell resource configuration based at least in part on the indication of the activation status of the cell.

As shown by reference number 860, the network node may communicate on the cell based at least in part on the DU cell resource configuration. For example, a DU of the network node that serves the cell may schedule communications on the cell in accordance with the DU cell resource configuration. More particularly, the DU of the network node may schedule communications in accordance with availability, directions, and/or cell directions indicated by the DU cell resource configuration.

By determining the DU cell resource configuration based at least in part on the cell being associated with CU2, CU1 may improve utilization of communication resources of the network node and/or nodes associated with the network node (e.g., parent nodes, child nodes, or other upstream or downstream nodes). Thus, throughput may be increased, interference may be reduced, and efficiency of the IAB network may be improved.

As indicated above, FIG. 8 is provided as an example. Other examples may differ from what was described with regard to FIG. 8.

Figure 9:
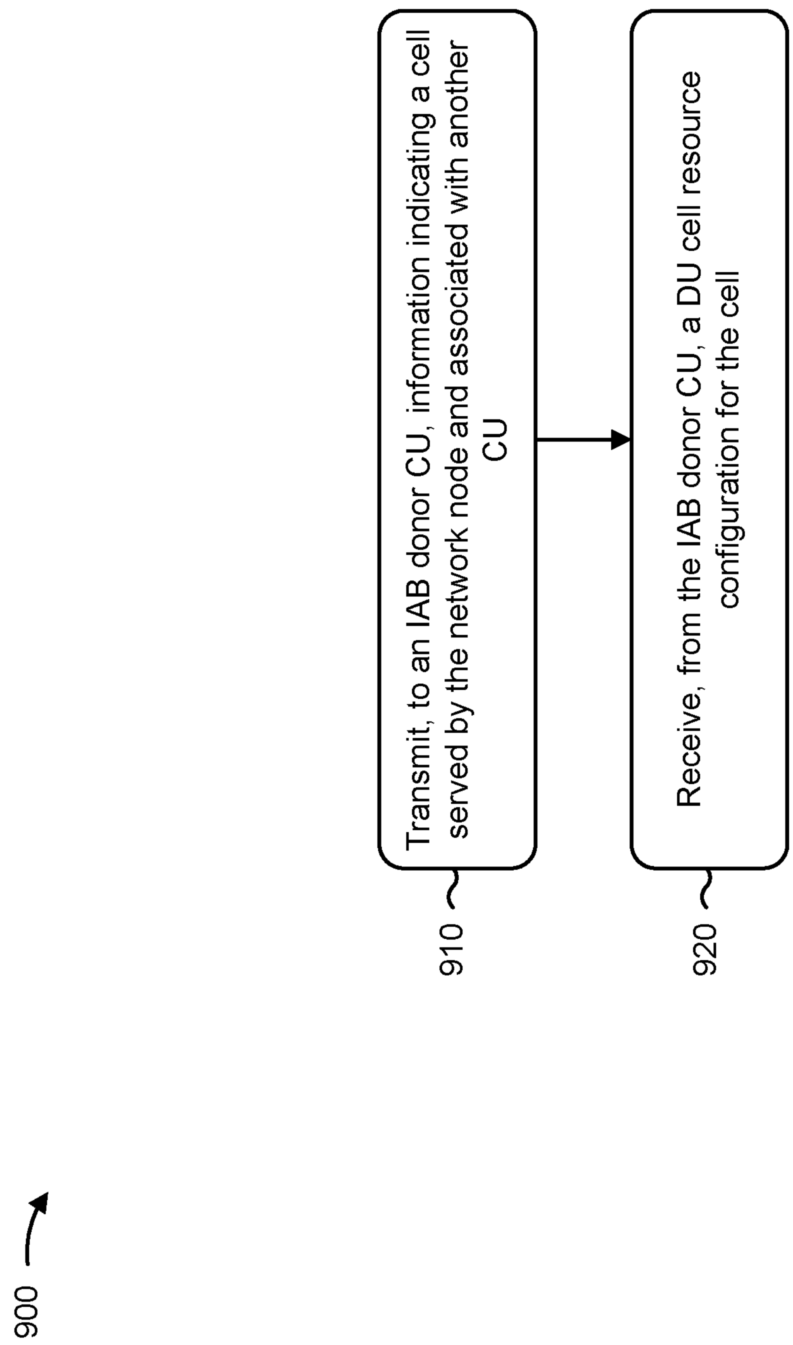
FIGS. 9-10 are diagrams illustrating example processes associated with RAN sharing for IAB, in accordance with the present disclosure.

FIG. 9 is a diagram illustrating an example process 900 performed, for example, by a network node, in accordance with the present disclosure. Example process 900 is an example where the network node (e.g., non-anchor base station 345, IAB node 410, the IAB-node of FIG. 6, the IAB-node of FIG. 7, the network node of FIG. 8, or one or more DUs described herein) performs operations associated with cell reporting for IAB RAN sharing.

As shown in FIG. 9, in some aspects, process 900 may include transmitting, to an IAB donor CU, information indicating a cell served by the network node and associated with another CU (block 910). For example, the network node (e.g., using transmission component 1104, depicted in FIG. 11) may transmit, to an IAB donor CU, information indicating a cell served by the network node and associated with another CU, as described above.

As further shown in FIG. 9, in some aspects, process 900 may include receiving, from the IAB donor CU, a DU cell resource configuration for the cell (block 920). For example, the network node (e.g., using reception component 1102, depicted in FIG. 11) may receive, from the IAB donor CU, a DU cell resource configuration for the cell, as described above. The DU cell resource configuration is also referred to herein as a cell resource configuration or a gNB-DU cell resource configuration.

Process 900 may include additional aspects, such as any single aspect or any combination of aspects described below and/or in connection with one or more other processes described elsewhere herein.

In a first aspect, process 900 includes communicating on the cell based at least in part on the DU cell resource configuration.

In a second aspect, alone or in combination with the first aspect, the network node is an IAB node.

In a third aspect, alone or in combination with one or more of the first and second aspects, the network node is an IAB donor DU.

In a fourth aspect, alone or in combination with one or more of the first through third aspects, the IAB donor CU is a first IAB donor CU and the other CU is a second IAB donor CU.

In a fifth aspect, alone or in combination with one or more of the first through fourth aspects, the IAB donor CU is associated with a first network and the other CU is associated with a second network.

In a sixth aspect, alone or in combination with one or more of the first through fifth aspects, the IAB donor CU is associated with resource management for an IAB network including the network node and the IAB donor CU, and traffic associated with the other CU is transported via the IAB network.

In a seventh aspect, alone or in combination with one or more of the first through sixth aspects, the information indicating the cell is transported via a signaling connection between the IAB donor CU and the network node, and the signaling connection is associated with at least one of an F1 control protocol, or a radio resource control protocol.

In an eighth aspect, alone or in combination with one or more of the first through seventh aspects, a signaling connection between the other CU and the network node is associated with at least one of an F1 control protocol, or a radio resource control protocol.

In a ninth aspect, alone or in combination with one or more of the first through eighth aspects, process 900 includes providing service to a child node of the network node, wherein the child node is associated with a radio resource control connection to the other CU.

In a tenth aspect, alone or in combination with one or more of the first through ninth aspects, the child node is a UE.

In an eleventh aspect, alone or in combination with one or more of the first through tenth aspects, the child node is an IAB node.

In a twelfth aspect, alone or in combination with one or more of the first through eleventh aspects, the cell is associated with a New Radio cell identifier that identifies the other CU.

In a thirteenth aspect, alone or in combination with one or more of the first through twelfth aspects, the cell is associated with a New Radio cell identifier that identifies the IAB donor CU, and the cell is deactivated by the IAB donor CU or access is barred for child nodes that select a public land mobile network associated with the IAB donor CU.

In a fourteenth aspect, alone or in combination with one or more of the first through thirteenth aspects, process 900 includes receiving an indication, from the other CU, that the cell is activated, and communicating on the cell based at least in part on the DU cell resource configuration and based at least in part on receiving the indication.

In a fifteenth aspect, alone or in combination with one or more of the first through fourteenth aspects, transmitting the information indicating the cell to the IAB donor CU is based at least in part on receiving the indication, from the other CU, that the cell is activated.

In a sixteenth aspect, alone or in combination with one or more of the first through fifteenth aspects, process 900 includes transmitting, to the IAB donor CU, information indicating an activation status of the cell based at least in part on receiving the indication.

In a seventeenth aspect, alone or in combination with one or more of the first through sixteenth aspects, receiving the DU cell resource configuration is based at least in part on the indication, from the other CU, that the cell is activated.

In an eighteenth aspect, alone or in combination with one or more of the first through seventeenth aspects, process 900 includes receiving, from the other CU, configuration information for the cell, and transmitting, to the IAB donor CU, at least part of the configuration information, wherein the DU cell resource configuration is based at least in part on the configuration information.

In a nineteenth aspect, alone or in combination with one or more of the first through eighteenth aspects, the cell is associated with a TDD mode.

In a twentieth aspect, alone or in combination with one or more of the first through nineteenth aspects, the cell is associated with an FDD mode.

In a twenty-first aspect, alone or in combination with one or more of the first through twentieth aspects, the DU cell resource configuration indicates a configuration for uplink communications on the cell and a configuration for downlink communications on the cell.

In a twenty-second aspect, alone or in combination with one or more of the first through twenty-first aspects, the DU cell resource configuration indicates availability of a communication resource of the cell.

In a twenty-third aspect, alone or in combination with one or more of the first through twenty-second aspects, the DU cell resource configuration indicates a direction of a communication resource of the cell.

In a twenty-fourth aspect, alone or in combination with one or more of the first through twenty-third aspects, the DU cell resource configuration indicates a cell direction of the cell.

In a twenty-fifth aspect, alone or in combination with one or more of the first through twenty-fourth aspects, the DU cell resource configuration is defined at a per-slot granularity.

In a twenty-sixth aspect, alone or in combination with one or more of the first through twenty-fifth aspects, the DU cell resource configuration is defined at a per-symbol granularity.

In a twenty-seventh aspect, alone or in combination with one or more of the first through twenty-sixth aspects, the DU cell resource configuration is defined at a per-symbol-group granularity.

In a twenty-eighth aspect, alone or in combination with one or more of the first through twenty-seventh aspects, the DU cell resource configuration is defined for a first carrier associated with the cell.

In a twenty-ninth aspect, alone or in combination with one or more of the first through twenty-eighth aspects, the DU cell resource configuration is defined at a per-bandwidth-part granularity.

In a thirtieth aspect, alone or in combination with one or more of the first through twenty-ninth aspects, the DU cell resource configuration is defined at a per-resource-block granularity or a per-resource-block-group granularity.

In a thirty-first aspect, alone or in combination with one or more of the first through thirtieth aspects, the DU cell resource configuration is associated with a spatial region.

In a thirty-second aspect, alone or in combination with one or more of the first through thirty-first aspects, the DU cell resource configuration is specific to a child node served on the cell.

In a thirty-third aspect, alone or in combination with one or more of the first through thirty-second aspects, process 900 includes communicating with a parent node of the network node based at least in part on configuration information associated with the cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
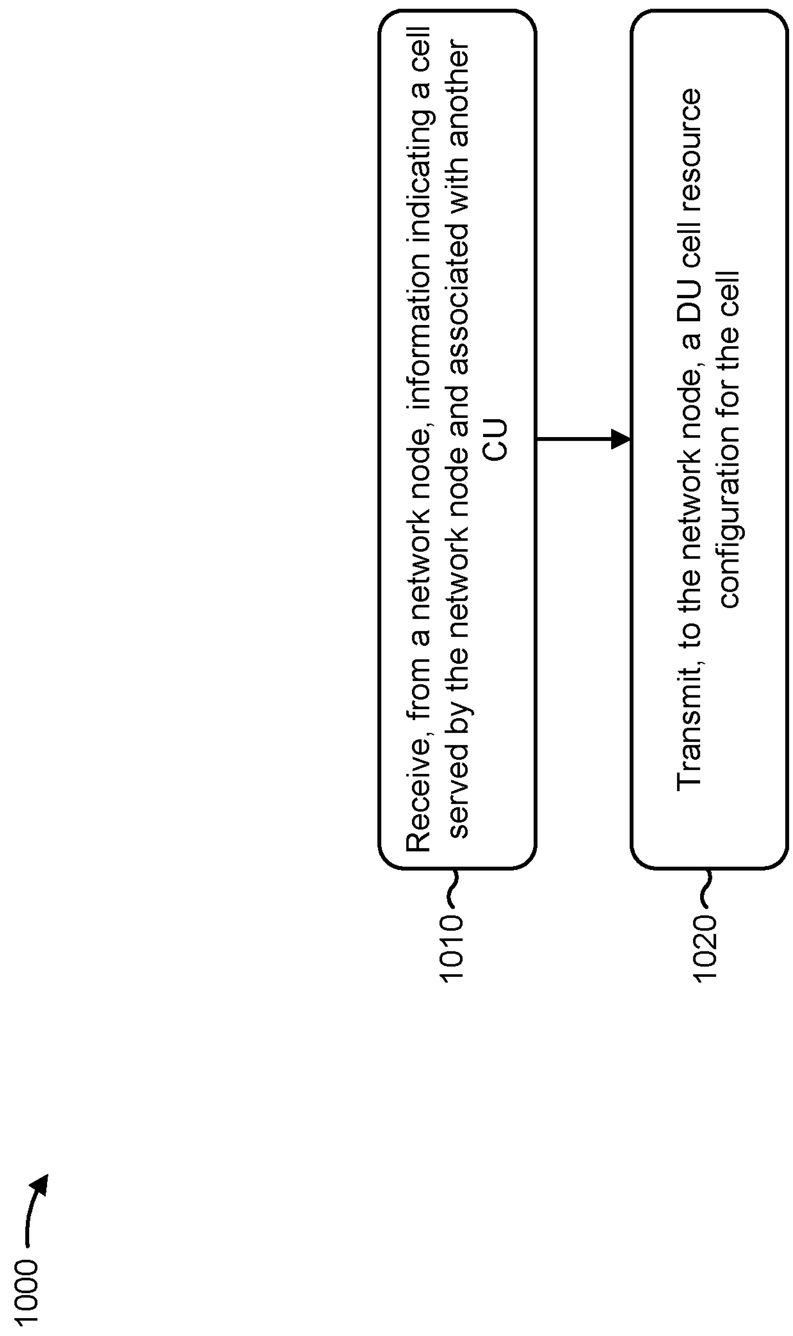

FIG. 10 is a diagram illustrating an example process 1000 performed, for example, by an IAB donor CU, in accordance with the present disclosure. Example process 1000 is an example where the IAB donor CU (e.g., anchor base station 335, IAB-donor 405, the IAB-donor CU of FIG. 6, the IAB-donor CU1 of FIG. 7, or the IAB donor CU1 of FIG. 8) performs operations associated with cell reporting for integrated access and backhaul radio access network sharing.

As shown in FIG. 10, in some aspects, process 1000 may include receiving, from a network node, information indicating a cell served by the network node and associated with another CU (block 1010). For example, the IAB donor CU (e.g., using reception component 1202 of FIG. 12) may receive, from a network node, information indicating a cell served by the network node and associated with another CU, as described above.

As further shown in FIG. 10, in some aspects, process 1000 may include transmitting, to the network node, a DU cell resource configuration for the cell (block 1020). For example, the IAB donor CU (e.g., using transmission component 1204, depicted in FIG. 12) may transmit, to the network node, a DU cell resource configuration for the cell, as described above.

Process 1000 may include additional aspects, such as any single aspect or any combination of aspects described below and/or in connection with one or more other processes described elsewhere herein.

In a first aspect, the network node is an IAB node.

In a second aspect, alone or in combination with the first aspect, the network node is an IAB donor DU.

In a third aspect, alone or in combination with one or more of the first and second aspects, the IAB donor CU is a first IAB donor CU and the other CU is a second IAB donor CU.

In a fourth aspect, alone or in combination with one or more of the first through third aspects, the IAB donor CU is associated with a first network and the other CU is associated with a second network.

In a fifth aspect, alone or in combination with one or more of the first through fourth aspects, the IAB donor CU is associated with resource management for an IAB network including the network node and the IAB donor CU, and traffic associated with the other CU is transported via the IAB network.

In a sixth aspect, alone or in combination with one or more of the first through fifth aspects, the information indicating the cell is transported via a signaling connection between the IAB donor CU and the network node, and the signaling connection is associated with at least one of an F1 control protocol, or a radio resource control protocol.

In a seventh aspect, alone or in combination with one or more of the first through sixth aspects, a signaling connection between the other CU and the network node is associated with at least one of an F1 control protocol, or a radio resource control protocol.

In an eighth aspect, alone or in combination with one or more of the first through seventh aspects, the cell is associated with a New Radio cell identifier that identifies the other CU.

In a ninth aspect, alone or in combination with one or more of the first through eighth aspects, the cell is associated with a New Radio cell identifier that identifies the IAB donor CU, and the cell is deactivated by the IAB donor CU or access is barred for child nodes that select a public land mobile network associated with the IAB donor CU.

In a tenth aspect, alone or in combination with one or more of the first through ninth aspects, the cell is activated by the other CU.

In an eleventh aspect, alone or in combination with one or more of the first through tenth aspects, receiving the information indicating the cell to the IAB donor CU is based at least in part on the cell being activated by the other CU.

In a twelfth aspect, alone or in combination with one or more of the first through eleventh aspects, process 1000 includes receiving, from the network node, information indicating an activation status of the cell.

In a thirteenth aspect, alone or in combination with one or more of the first through twelfth aspects, transmitting the DU cell resource configuration is based at least in part on the cell being activated by the other CU.

In a fourteenth aspect, alone or in combination with one or more of the first through thirteenth aspects, process 1000 includes receiving, from the network node, configuration information for the cell, wherein the DU cell resource configuration is based at least in part on the configuration information.

In a fifteenth aspect, alone or in combination with one or more of the first through fourteenth aspects, the cell is associated with a TDD mode.

In a sixteenth aspect, alone or in combination with one or more of the first through fifteenth aspects, the cell is associated with an FDD mode.

In a seventeenth aspect, alone or in combination with one or more of the first through sixteenth aspects, the DU cell resource configuration indicates a configuration for uplink communications on the cell and a configuration for downlink communications on the cell.

In an eighteenth aspect, alone or in combination with one or more of the first through seventeenth aspects, the DU cell resource configuration indicates availability of a communication resource of the cell.

In a nineteenth aspect, alone or in combination with one or more of the first through eighteenth aspects, the DU cell resource configuration indicates a direction of a communication resource of the cell.

In a twentieth aspect, alone or in combination with one or more of the first through nineteenth aspects, the DU cell resource configuration indicates a cell direction of the cell.

In a twenty-first aspect, alone or in combination with one or more of the first through twentieth aspects, the DU cell resource configuration is defined at a per-slot granularity.

In a twenty-second aspect, alone or in combination with one or more of the first through twenty-first aspects, the DU cell resource configuration is defined at a per-symbol granularity.

In a twenty-third aspect, alone or in combination with one or more of the first through twenty-second aspects, the DU cell resource configuration is defined at a per-symbol-group granularity.

In a twenty-fourth aspect, alone or in combination with one or more of the first through twenty-third aspects, the DU cell resource configuration is defined for a first carrier associated with the cell.

In a twenty-fifth aspect, alone or in combination with one or more of the first through twenty-fourth aspects, the DU cell resource configuration is defined at a per-bandwidth-part granularity.

In a twenty-sixth aspect, alone or in combination with one or more of the first through twenty-fifth aspects, the DU cell resource configuration is defined at a per-resource-block granularity or a per-resource-block-group granularity.

In a twenty-seventh aspect, alone or in combination with one or more of the first through twenty-sixth aspects, the DU cell resource configuration is associated with a spatial region.

In a twenty-eighth aspect, alone or in combination with one or more of the first through twenty-seventh aspects, the DU cell resource configuration is specific to a child node served on the cell.

In a twenty-ninth aspect, alone or in combination with one or more of the first through twenty-eighth aspects, process 1000 includes transmitting, to a parent node of the network node, configuration information regarding the cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
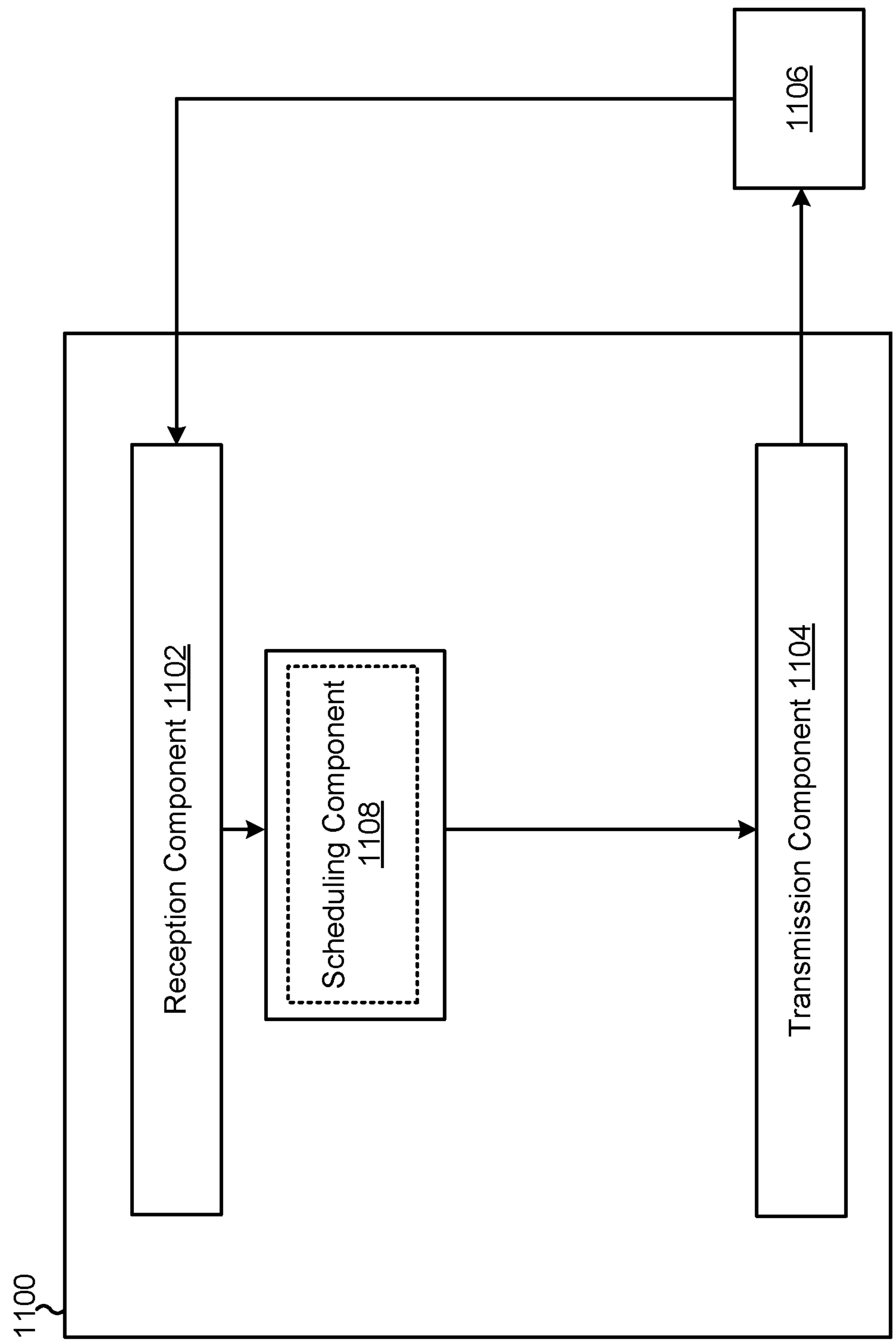
FIGS. 11-12 are block diagrams of example apparatuses for wireless communication, in accordance with the present disclosure.

FIG. 11 is a block diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a scheduling component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the network node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the network node described above in connection with FIG. 2. In some aspects, the transmission component 1104 may be collocated with the reception component 1102 in a transceiver.

The transmission component 1104 may transmit, to an IAB donor CU, information indicating a cell served by the network node and associated with another CU. The reception component 1102 may receive, from the IAB donor CU, a DU cell resource configuration for the cell.

In some aspects, the scheduling component 1108, the transmission component 1104, and/or the reception component 1102 may communicate on the cell based at least in part on the DU cell resource configuration. In some aspects, the scheduling component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the scheduling component 1108 may be associated with a DU.

In some aspects, the scheduling component 1108 may also provide service to a child node of the network node, wherein the child node is associated with a radio resource control connection to the other CU.

In some aspects, the reception component 1102 may receive an indication, from the other CU, that the cell is activated.

In some aspects, the scheduling component 1108, the transmission component 1104, and/or the reception component 1102 may communicate on the cell based at least in part on the DU cell resource configuration and based at least in part on receiving the indication.

In some aspects, the transmission component 1104 may transmit, to the IAB donor CU, information indicating an activation status of the cell based at least in part on receiving the indication.

In some aspects, the reception component 1102 may receive, from the other CU, configuration information for the cell.

The transmission component 1104 may transmit, to the IAB donor CU, at least part of the configuration information, wherein the DU cell resource configuration is based at least in part on the configuration information.

In some aspects, the scheduling component 1108, the transmission component 1104, and/or the reception component 1102 may communicate with a parent node of the network node based at least in part on configuration information associated with the cell.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
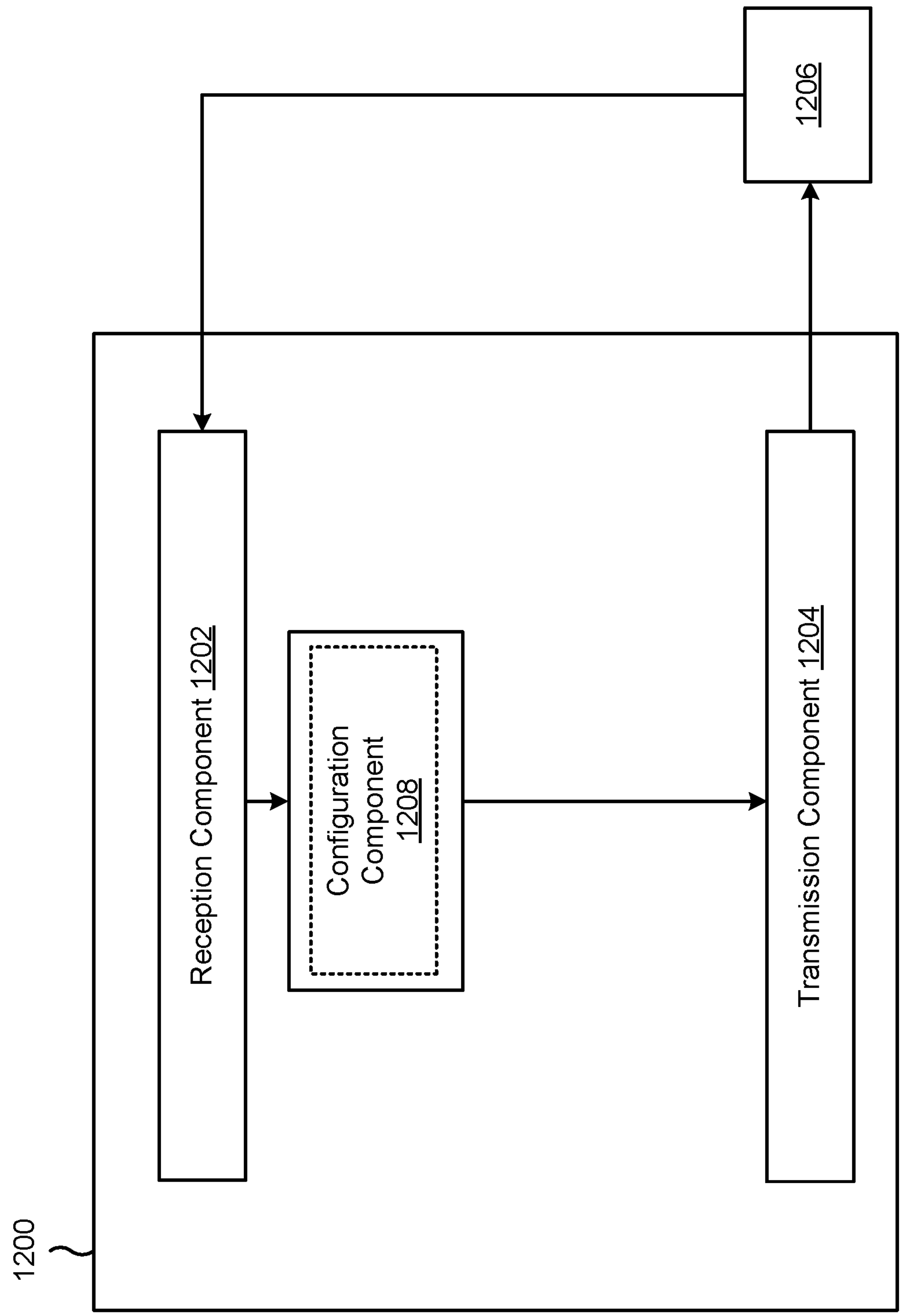

FIG. 12 is a block diagram of an example apparatus 1200 for wireless communication. The apparatus 1200 may be an IAB donor CU, or an IAB donor CU may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a configuration component 1208, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the IAB donor CU described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

The reception component 1202 may receive, from a network node, information indicating a cell served by the network node and associated with another CU. The transmission component 1204 may transmit, to the network node, a DU cell resource configuration for the cell.

In some aspects, the reception component 1202 may receive, from the network node, information indicating an activation status of the cell. In some aspects, the reception component 1202 may receive, from the network node, configuration information for the cell, wherein the DU cell resource configuration is based at least in part on the configuration information.

In some aspects, the transmission component 1204 or the configuration component 1208 may transmit, to a parent node of the network node, configuration information regarding the cell. In some aspects, the configuration component 1208 may include one or more antennas, a modulator, a transmit MIMO processor, a transmit processor, a controller/processor, a memory, or a combination thereof The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network node, comprising: transmitting, to an integrated access and backhaul (IAB) donor central unit (CU), information indicating a cell served by the network node and associated with another CU; and receiving, from the IAB donor CU, a distributed unit (DU) cell resource configuration for the cell.

Aspect 2: The method of Aspect 1, further comprising: communicating on the cell based at least in part on the DU cell resource configuration.

Aspect 3: The method of one or more of the previous Aspects, wherein the network node is an IAB node.

Aspect 4: The method of one or more of the previous Aspects, wherein the network node is an IAB donor DU.

Aspect 5: The method of one or more of the previous Aspects, wherein the IAB donor CU is a first IAB donor CU and the other CU is a second IAB donor CU.

Aspect 6: The method of one or more of the previous Aspects, wherein the IAB donor CU is associated with a first network and the other CU is associated with a second network.

Aspect 7: The method of one or more of the previous Aspects, wherein the IAB donor CU is associated with resource management for an IAB network including the network node and the IAB donor CU, and wherein traffic associated with the other CU is transported via the IAB network.

Aspect 8: The method of one or more of the previous Aspects, wherein the information indicating the cell is transported via a signaling connection between the IAB donor CU and the network node, and wherein the signaling connection is associated with at least one of: an F1 control protocol, or a radio resource control protocol.

Aspect 9: The method of one or more of the previous Aspects, wherein a signaling connection between the other CU and the network node is associated with at least one of: an F1 control protocol, or a radio resource control protocol.

Aspect 10: The method of one or more of the previous Aspects, further comprising: providing service to a child node of the network node, wherein the child node is associated with a radio resource control connection to the other CU.

Aspect 11: The method of Aspect 10, wherein the child node is a UE.

Aspect 12: The method of Aspect 10, wherein the child node is an IAB node.

Aspect 13: The method of one or more of the previous Aspects, wherein the cell is associated with a New Radio cell identifier that identifies the other CU.

Aspect 14: The method of one or more of the previous Aspects, wherein the cell is associated with a New Radio cell identifier that identifies the IAB donor CU, and wherein the cell is deactivated by the IAB donor CU or access is barred for child nodes that select a public land mobile network associated with the IAB donor CU.

Aspect 15: The method of one or more of the previous Aspects, further comprising: receiving an indication, from the other CU, that the cell is activated; and communicating on the cell based at least in part on the DU cell resource configuration and based at least in part on receiving the indication.

Aspect 16: The method of Aspect 15, wherein transmitting the information indicating the cell to the IAB donor CU is based at least in part on receiving the indication, from the other CU, that the cell is activated.

Aspect 17: The method of Aspect 15, further comprising: transmitting, to the IAB donor CU, information indicating an activation status of the cell based at least in part on receiving the indication.

Aspect 18: The method of Aspect 15, wherein receiving the DU cell resource configuration is based at least in part on the indication, from the other CU, that the cell is activated.

Aspect 19: The method of one or more of the previous Aspects, further comprising: receiving, from the other CU, configuration information for the cell; and transmitting, to the IAB donor CU, at least part of the configuration information, wherein the DU cell resource configuration is based at least in part on the configuration information.

Aspect 20: The method of one or more of the previous Aspects, wherein the cell is associated with a time division duplexing (TDD) mode.

Aspect 21: The method of one or more of the previous Aspects, wherein the cell is associated with a frequency division duplexing (FDD) mode.

Aspect 22: The method of Aspect 21, wherein the DU cell resource configuration indicates a configuration for uplink communications on the cell and a configuration for downlink communications on the cell.

Aspect 23: The method of one or more of the previous Aspects, wherein the DU cell resource configuration indicates availability of a communication resource of the cell.

Aspect 24: The method of one or more of the previous Aspects, wherein the DU cell resource configuration indicates a direction of a communication resource of the cell.

Aspect 25: The method of one or more of the previous Aspects, wherein the DU cell resource configuration indicates a cell direction of the cell.

Aspect 26: The method of one or more of the previous Aspects, wherein the DU cell resource configuration is defined at a per-slot granularity.

Aspect 27: The method of one or more of the previous Aspects, wherein the DU cell resource configuration is defined at a per-symbol granularity.

Aspect 28: The method of one or more of the previous Aspects, wherein the DU cell resource configuration is defined at a per-symbol-group granularity.

Aspect 29: The method of one or more of the previous Aspects, wherein the DU cell resource configuration is defined for a first carrier associated with the cell.

Aspect 30: The method of one or more of the previous Aspects, wherein the DU cell resource configuration is defined at a per-bandwidth-part granularity.

Aspect 31: The method of one or more of the previous Aspects, wherein the DU cell resource configuration is defined at a per-resource-block granularity or a per-resource-block-group granularity.

Aspect 32: The method of one or more of the previous Aspects, wherein the DU cell resource configuration is associated with a spatial region.

Aspect 33: The method of one or more of the previous Aspects, wherein the DU cell resource configuration is specific to a child node served on the cell.

Aspect 34: The method of one or more of the previous Aspects, further comprising: communicating with a parent node of the network node based at least in part on configuration information associated with the cell.

Aspect 35: A method of wireless communication performed by an integrated access and backhaul (IAB) donor central unit (CU), comprising: receiving, from a network node, information indicating a cell served by the network node and associated with another CU; and transmitting, to the network node, a distributed unit (DU) cell resource configuration for the cell.

Aspect 36: The method of Aspect 35, wherein the network node is an IAB node.

Aspect 37: The method of any one of Aspects 35-36, wherein the network node is an IAB donor DU.

Aspect 38: The method of any one of Aspects 35-37, wherein the IAB donor CU is a first IAB donor CU and the other CU is a second IAB donor CU.

Aspect 39: The method of any one of Aspects 35-38, wherein the IAB donor CU is associated with a first network and the other CU is associated with a second network.

Aspect 40: The method of any one of Aspects 35-39, wherein the IAB donor CU is associated with resource management for an IAB network including the network node and the IAB donor CU, and wherein traffic associated with the other CU is transported via the IAB network.

Aspect 41: The method of any one of Aspects 35-40, wherein the information indicating the cell is transported via a signaling connection between the IAB donor CU and the network node, and wherein the signaling connection is associated with at least one of: an F1 control protocol, or a radio resource control protocol.

Aspect 42: The method of any one of Aspects 35-41, wherein a signaling connection between the other CU and the network node is associated with at least one of: an F1 control protocol, or a radio resource control protocol.

Aspect 43: The method of any one of Aspects 35-42, wherein the cell is associated with a New Radio cell identifier that identifies the other CU.

Aspect 44: The method of any one of Aspects 35-43, wherein the cell is associated with a New Radio cell identifier that identifies the IAB donor CU, and wherein the cell is deactivated by the IAB donor CU or access is barred for child nodes that select a public land mobile network associated with the IAB donor CU.

Aspect 45: The method of any one of Aspects 35-44, wherein the cell is activated by the other CU.

Aspect 46: The method of Aspect 45, wherein receiving the information indicating the cell to the IAB donor CU is based at least in part on the cell being activated by the other CU.

Aspect 47: The method of Aspect 46, further comprising: receiving, from the network node, information indicating an activation status of the cell.

Aspect 48: The method of Aspect 45, wherein transmitting the DU cell resource configuration is based at least in part on the cell being activated by the other CU.

Aspect 49: The method of any one of Aspects 35-48, further comprising: receiving, from the network node, configuration information for the cell, wherein the DU cell resource configuration is based at least in part on the configuration information.

Aspect 50: The method of any one of Aspects 35-49, wherein the cell is associated with a time division duplexing (TDD) mode.

Aspect 51: The method of any one of Aspects 35-50, wherein the cell is associated with a frequency division duplexing (FDD) mode.

Aspect 52: The method of Aspect 51, wherein the DU cell resource configuration indicates a configuration for uplink communications on the cell and a configuration for downlink communications on the cell.

Aspect 53: The method of any one of Aspects 35-52, wherein the DU cell resource configuration indicates availability of a communication resource of the cell.

Aspect 54: The method of any one of Aspects 35-53, wherein the DU cell resource configuration indicates a direction of a communication resource of the cell.

Aspect 55: The method of any one of Aspects 35-54, wherein the DU cell resource configuration indicates a cell direction of the cell.

Aspect 56: The method of any one of Aspects 35-55, wherein the DU cell resource configuration is defined at a per-slot granularity.

Aspect 57: The method of any one of Aspects 35-56, wherein the DU cell resource configuration is defined at a per-symbol granularity.

Aspect 58: The method of any one of Aspects 35-57, wherein the DU cell resource configuration is defined at a per-symbol-group granularity.

Aspect 59: The method of any one of Aspects 35-58, wherein the DU cell resource configuration is defined for a first carrier associated with the cell.

Aspect 60: The method of any one of Aspects 35-59, wherein the DU cell resource configuration is defined at a per-bandwidth-part granularity.

Aspect 61: The method of any one of Aspects 35-60, wherein the DU cell resource configuration is defined at a per-resource-block granularity or a per-resource-block-group granularity.

Aspect 62: The method of any one of Aspects 35-61, wherein the DU cell resource configuration is associated with a spatial region.

Aspect 63: The method of any one of Aspects 35-62, wherein the DU cell resource configuration is specific to a child node served on the cell.

Aspect 64: The method of any one of Aspects 35-63, further comprising: transmitting, to a parent node of the network node, configuration information regarding the cell.

Aspect 65: An apparatus for wireless communication at a device, comprising a processor; memory coupled with the processor; and instructions stored in the memory and executable by the processor to cause the apparatus to perform the method of one or more of Aspects 1-64.

Aspect 66: A device for wireless communication, comprising a memory and one or more processors coupled to the memory, the one or more processors configured to perform the method of one or more of Aspects 1-64.

Aspect 67: An apparatus for wireless communication, comprising at least one means for performing the method of one or more of Aspects 1-64.

Aspect 68: A non-transitory computer-readable medium storing code for wireless communication, the code comprising instructions executable by a processor to perform the method of one or more of Aspects 1-64.

Aspect 69: A non-transitory computer-readable medium storing a set of instructions for wireless communication, the set of instructions comprising one or more instructions that, when executed by one or more processors of a device, cause the device to perform the method of one or more of Aspects 1-64.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:

one or more memories storing processor-readable code; and one or more processors coupled with the one or more memories, at least one of the one or more processors operable to cause the network node to:

receive, from a second central unit (CU), an indication that a cell served by the network node and associated with the second CU is activated;

transmit, to a first integrated access and backhaul (IAB) donor CU responsive to the indication, information indicating the cell; and receive, from the first TAB donor CU, a distributed unit (DU) cell resource configuration for the cell.

2. The apparatus of claim 1, the at least one of the one or more processors operable to cause the network node to:

communicate on the cell in accordance with the DU cell resource configuration.

3. The apparatus of claim 1, wherein the network node is an IAB node or an IAB donor DU.

4. The apparatus of claim 1, wherein the second CU is a second IAB donor CU.

5. The apparatus of claim 1, wherein the first IAB donor CU is associated with resource management for an IAB network including the network node and the first IAB donor CU, and wherein traffic associated with the second CU is transported via the IAB network.

6. The network node apparatus of claim 1, wherein the information indicating the cell is transported via a signaling connection between the first IAB donor CU and the network node, and wherein the signaling connection is associated with at least one of:

an F1 control protocol, or a radio resource control protocol, and wherein a signaling connection between the second CU and the network node is associated with at least one of:

the F1 control protocol, or the radio resource control protocol.

7. The apparatus of claim 1, the at least one of the one or more processors operable to cause the network node to:

provide service to a child node of the network node, wherein the child node is associated with a radio resource control connection to the second CU.

8. The apparatus of claim 1, wherein the cell is associated with a New Radio cell identifier that identifies the second CU.

9. The apparatus of claim 1, wherein the cell is associated with a New Radio cell identifier that identifies the first IAB donor CU, and wherein the cell is deactivated by the first IAB donor CU or access is barred for child nodes that select a public land mobile network associated with the first IAB donor CU.

10. The apparatus of claim 1, the at least one of the one or more processors operable to cause the network node to:

communicate on the cell in accordance with the DU cell resource configuration and responsive to receiving the indication.

11. The apparatus of claim 1, the at least one of the one or more processors operable to cause the network node to:

transmit, to the IAB donor CU, information indicating an activation status of the cell responsive to receiving the indication.

12. The apparatus of claim 1, wherein the DU cell resource configuration indicates availability of a communication resource of the cell.

13. The apparatus of claim 12, wherein the communication resource is at least one of a time resource, a frequency resource, or a spatial resource.

14. The apparatus of claim 1, wherein the DU cell resource configuration indicates a direction of a communication resource of the cell.

15. The apparatus of claim 14, wherein the communication resource is at least one of a time resource, a frequency resource, or a spatial resource.

16. The apparatus of claim 1, wherein the DU cell resource configuration is specific to a child node served on the cell.

17. The apparatus of claim 1, the at least one of the one or more processors operable to cause the network node to:

communicate with a parent node of the network node in accordance with configuration information associated with the cell.

18. An apparatus for wireless communication at an integrated access and backhaul (IAB) donor central unit (CU), comprising:

one or more memories storing processor-readable code; and one or more processors coupled with the one or more memories, at least one of the one or more processors operable to cause the IAB donor CU to:

receive, from a network node, information indicating a cell served by the network node and associated with another CU in accordance with the cell being activated by the other CU; and transmit, to the network node, a distributed unit (DU) cell resource configuration for the cell.

19. The apparatus of claim 18, wherein the network node is an IAB node or an IAB donor DU.

20. The apparatus of claim 18, wherein the IAB donor CU is associated with a first network and the other CU is associated with a second network.

21. The apparatus of claim 18, wherein the IAB donor CU is associated with resource management for an IAB network including the network node and the IAB donor CU, and wherein traffic associated with the other CU is transported via the IAB network.

22. The apparatus of claim 18, wherein the information indicating the cell is transported via a signaling connection between the IAB donor CU and the network node, and wherein the signaling connection is associated with at least one of:

an F1 control protocol, or a radio resource control protocol, and wherein a signaling connection between the other CU and the network node is associated with at least one of:

the F1 control protocol, or the radio resource control protocol.

23. The apparatus of claim 18, wherein the cell is associated with a New Radio cell identifier that identifies the other CU.

24. The apparatus of claim 18, wherein the cell is associated with a New Radio cell identifier that identifies the IAB donor CU, and wherein the cell is deactivated by the IAB donor CU or access is barred for child nodes that select a public land mobile network associated with the IAB donor CU.

25. The apparatus of claim 18, the at least one of the one or more processors operable to cause the IAB donor CU to:

receive, from the network node, information indicating an activation status of the cell.

26. The apparatus of claim 18, wherein transmission of the DU cell resource configuration is in accordance with the cell being activated by the other CU.

27. The apparatus of claim 18, wherein the DU cell resource configuration indicates availability or a direction of a communication resource of the cell.

28. The apparatus of claim 27, wherein the communication resource is at least one of a time resource, a frequency resource, or a spatial resource.

29. A method of wireless communication performed at a network node, comprising:

receiving, from a second central unit (CU), an indication that a cell served by the network node and associated with the second CU is activated;

transmitting, to a first integrated access and backhaul (IAB) donor CU responsive to the indication, information indicating the cell; and receiving, from the first IAB donor CU, a distributed unit (DU) cell resource configuration for the cell.

30. A method of wireless communication performed at an integrated access and backhaul (IAB) donor central unit (CU), comprising:

receiving, from a network node, information indicating a cell served by the network node and associated with another CU in accordance with the cell being activated by the other CU; and transmitting, to the network node, a distributed unit (DU) cell resource configuration for the cell.

* * * * *